United States Patent [19]

Kitaura

[11] Patent Number: 4,954,894
[45] Date of Patent: Sep. 4, 1990

[54] RECURSIVE NOISE-REDUCER

[75] Inventor: Masahiro Kitaura, Nagareyama, Japan

[73] Assignee: Victor Company of Japan, Ltd., Yokohama, Japan

[21] Appl. No.: 322,483

[22] Filed: Mar. 13, 1989

[30] Foreign Application Priority Data

Mar. 14, 1988 [JP] Japan .................................. 63-60116

[51] Int. Cl.$^5$ .............................................. H04N 5/21
[52] U.S. Cl. ...................................... 358/167; 358/36
[58] Field of Search .......................... 358/167, 39, 36

[56] References Cited

U.S. PATENT DOCUMENTS

| | | | |
|---|---|---|---|
| 4,500,911 | 2/1985 | Ninomiya et al. | 358/167 |
| 4,539,594 | 9/1985 | Illetschko | 358/167 |
| 4,796,088 | 1/1989 | Nishimura et al. | 358/167 |
| 4,807,034 | 2/1989 | Takeuchi et al. | 358/167 |
| 4,860,104 | 8/1989 | Katsuyama | 358/167 |
| 4,876,734 | 10/1989 | Kawamura | 358/36 |
| 4,888,642 | 12/1989 | Kato | 358/36 |

FOREIGN PATENT DOCUMENTS 2202706 9/1988 United Kingdom .

*Primary Examiner*—Tommy P. Chin
*Assistant Examiner*—James Juo
*Attorney, Agent, or Firm*—Pollock, VandeSande & Priddy

[57] ABSTRACT

A recursive noise-reducer for a high-definition TV system includes an interpolation device for performing two-frame interframe interpolation on the input digital signal. A delay device delays the input digital signal by one frame period and two frame period. An output signal from the delay device is separated into a one-frame-preceding signal component and a two-frame-preceding signal component. A first subtracter derives a difference between the input digital signal and the one-frame-preceding signal component. A filter filters an output signal from the first subtracter and passes a signal component having a recursion with a period corresponding to one frame. A second subtracter derives a difference between the input digital signal and the two-frame-preceding signal component. An adder adds the input digital signal, an output signal from the filter, and an output signal from the second subtracter. The interpolation device operates to alternately select an output signal from the adder and the one-frame-preceding signal component and to thereby generate the interpolated signal from which noise components are effectively reduced.

4 Claims, 4 Drawing Sheets

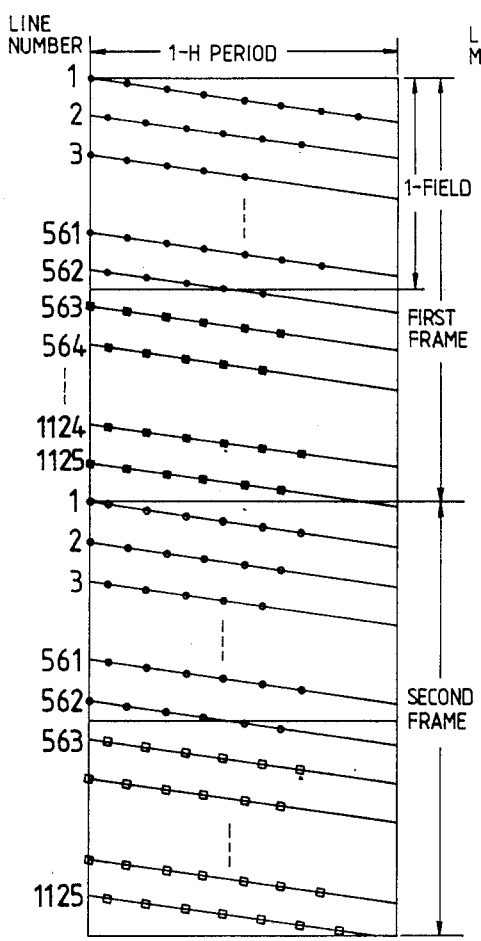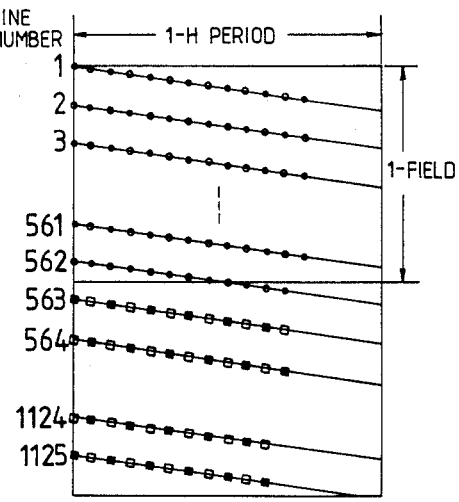

RECURSIVE NOISE-REDUCER

BACKGROUND OF THE INVENTION

This invention relates to a noise reducer using a recursive digital filter.

It is known to use recursive digital filters to reduce noises in video signals. Such recursive noise-reducers are based on the correlation between frames of the video signals.

In the MUSE (Multiple Sub-Nyquist Sampling Encoding) transmission system for high-quality (or high-definition) television (Hi-Vision), a luminance signal (Y signal) has a recursive period corresponding to two frames. Accordingly, recursive noise-reducers for the MUSE system are designed so as to operate on the basis of the correlation between frames separated at two-frame intervals. Such noise-reducers tend to have inadequate effects since the correlation between frames separated at two-frame intervals is relatively less existent.

SUMMARY OF THE INVENTION

It is an object of this invention to provide an effective recursive noise-reducer.

A recursive noise-reducer of this invention comprises:

first switch means for performing an interframe interpolation process on an input digital signal and thereby converting the input digital signal into an interpolated signal;

memory means having a capacity equal to one frame of the interpolated signal;

second switch means for outputting from the memory means a one-frame-preceding signal component of the input digital signal and a two-frame-preceding signal component of the input digital signal;

first subtracting means for deriving a difference between the input digital signal and the one-frame-preceding signal component;

a first filter filtering an output signal from the first subtracting means and passing a signal component having a recursion with a period corresponding to one frame;

a first multiplier multiplying an output signal from the first filter by a predetermined first coefficient;

second subtracting means for deriving a difference between the input digital signal and the two-frame-preceding signal component;

a second filter filtering an output signal from the second subtracting means and passing a signal component having a recursion with a period corresponding to two frames;

a second multiplier multiplying an output signal from the second filter by a predetermined second coefficient; and an adder adding the input digital signal, an output signal from the first multiplier, and an output signal from the second multiplier;

wherein the first switch means alternately select either of an output signal from the adder and the one-frame-preceding signal component and thereby generating the interpolated signal with reduced noise components.

Another recursive noise-reducer of this invention comprises:

interpolation means for performing an interframe interpolation process on an input digital signal and thereby converting the input digital signal into an interpolated signal;

delay means delaying the input digital signal by up to two frame periods of the input digital signal, said interpolation means outputting from the delay means a one-frame-preceding signal component of the input digital signal and a two-frame-preceding signal component of the input digital signal;

first subtracting means for deriving a difference between the input digital signal and the one-frame-preceding signal component;

a filter filtering an output signal from the first subtracting means and passing a signal component having a recursion with a period corresponding to one frame;

second subtracting means for deriving a difference between the input digital signal and the two-frame-preceding signal component; and an adder adding the input digital signal, an output signal from the filter, and an output signal from the second subtracting means;

wherein the interpolation means comprises means for alternately selecting an output signal from the adder and the one-frame-preceding signal component and thereby generating the interpolated signal with reduced noise components.

BRIEF DESCRIPTION OF THE DRAWINGS

FIG. 2 is a diagram showing a sampling pattern of the MUSE Y signal.

FIG. 4 is a diagram of a sampling pattern of the MUSE Y signal which occurs after interframe interpolation is performed.

Like and corresponding elements are denoted by the same reference characters throughout the drawings.

DESCRIPTION OF THE FIRST PREFERRED EMBODIMENT

Before the description of this invention, a luminance signal (Y signal) of the MUSE system will be explained briefly.

Figure 1A:
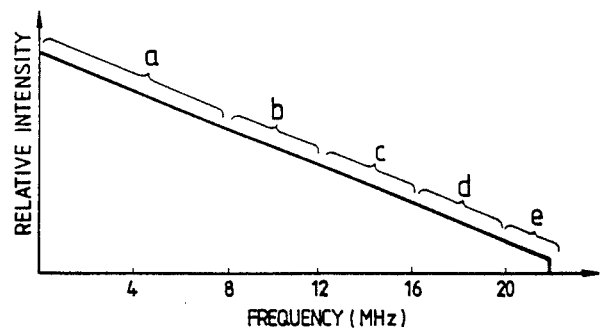
FIG. 1(A) is a diagram of a frequency spectrum of an original MUSE Y signal.

In a transmitter, as shown in FIG. 1(A), an original MUSE Y signal has a frequency band extending up to 22 MHz. In FIG. 1(A), the letters "a"–"e" denote respective parts of the Y signal band. As shown in FIG.

Figure 1B:
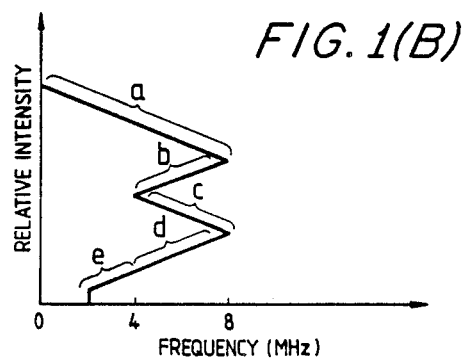
FIG. 1(B) is a diagram of a frequency spectrum of a band-compressed MUSE Y signal.

1(B), the Y signal band is folded through band compression using sampling processes. Specifically, the original Y signal is sampled at a frequency of 48.6 MHz and is then subjected to field-offset sub sampling with a frequency of 24.3 MHz and frame-offset sub sampling with a frequency of 16.2 MHz so that the band of the Y signal is compressed into a frequency range below 8.1 MHz. As shown in FIG. 1(B), the intermediate and high frequency parts "b"–"e" of the band of the Y signal are folded into the range below 8.1 MHz so that the width of the base band of the Y signal is 8.1 MHz. The Y signal is converted into an analog signal before it is transmitted.

In a receiver, the transmitted MUSE Y signal is subjected to an analog-to-digital conversion with a sub sampling clock of 16.2 MHz which is controlled in response to a sub sampling signal contained in a transmitted control signal.

FIG. 2 shows a sampling pattern of the MUSE Y signal. In FIG. 2, small circles and squares denote sampling points in pictures. As shown in FIG. 2, sampling points in alternate lines are offset from sampling points in the other alternate lines. In addition, sampling points in alternate frames are offset from the other alternate frames. Accordingly, the MUSE Y signal has a recursion with a period corresponding to two frames.

Figure 3:
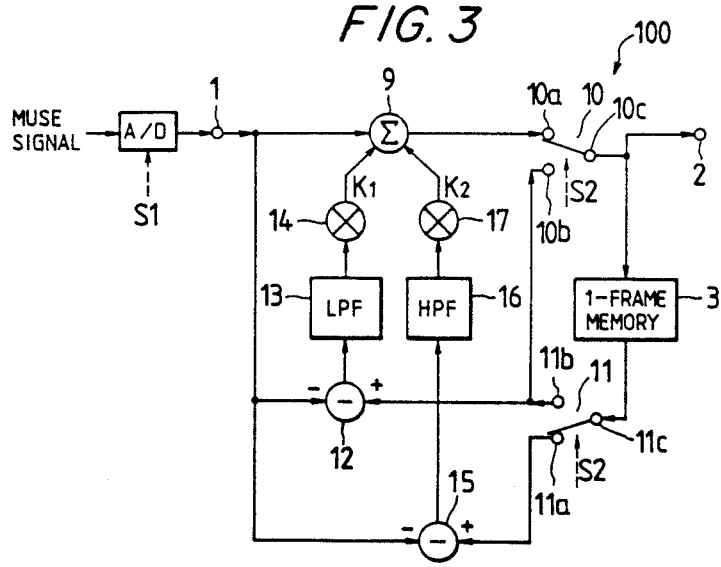
FIG. 3 is a block diagram of a recursive noise-reducer according to a first embodiment of this invention.

A first embodiment of this invention will be described hereinafter. With reference to FIG. 3, a transmitted MUSE Y signal is transformed into a corresponding digital MUSE Y signal by an analog-to-digital (A/D) converter (no reference numeral) with a sub sampling clock S1 of 16.2 MHz in a known manner. The digital MUSE Y signal is inputted into a recursive noise-reducer via an input terminal 1.

The input Y signal is added to two other signals by an adder 9. The output from the adder 9 is transmitted to an output terminal 2 via an interpolation device 100 and forms an output signal from the recursive noise-reducer. The interpolation device 100 performs an interframe interpolation process which generates data at non-sampling points on the basis of data at sampling points.

The interpolation device 100 includes a switch 10 having a movable contact 10c and stationary contacts 10a and 10b, and a switch 11 having a movable contact 11c and stationary contacts 11a and 11b. The movable contacts 10c and 11c are connected in synchronization to either stationary contacts 10a and 11a as shown in FIG. 3 or to stationary contacts 10b and 11b respectively in response to a switching clock S2 of 16.2 MHz. The movable contact 10c is connected to the noise-reducer output terminal 2. The switching clock S2 is derived from the sub sampling clock S1 so as to have a phase relationship therebetween in such a manner that the phase of the clock S2 is inverted with respect to that of the clock S1 for every odd-numbered lines in the first frame and for every even-numbered lines in the subsequent second frame, but the phase relationship between the clocks S2 and S1 is maintained non-inverted for the other lines in the two consecutive frames. This arrangement is recycled at every two frame periods. A generator for the switching clocks S2 will be described later. The stationary contact 10a receives current output data from the adder 9. Subsequently, when the movable contacts 10c and 11c are flipped to the stationary contacts 10b and 11b respectively, the stationary contact 10b receives one-frame-period preceding data previously outputted from the adder 9 and stored in a 1-frame memory 3. Accordingly, a current adder output and the one-frame-period preceding adder output are alternately selected and passed to the noise-reducer output terminal 2 in response to the switching clock S2 so that the one-frame-preceding data are interpolated into the current data.

FIG. 4 shows a pattern of data points of the output signal from the recursive noise-reducer. In FIG. 4, black dots and squares represent data sampled from one frame and white dots and squares represent data sampled from a subsequent frame shown in FIG. 2 as performed by the interframe interpolation process.

The signal from the movable contact 10c is fed to the one-frame memory 3. This memory 3 has a data capacity equal to one complete frame an already interpolated signal to be outputted, and is capable of writing and reading two consecutive frames of data of the input digital signal) thus the memory 3 functions to delay the input signal by a time corresponding to one frame. The output signal from the memory 3 is applied to the switch 11. The output signal from the memory 3 contains data which precede the current adder output by a one-frame interval and also data which precede the current adder output by a two-frame interval. The one-frame-preceding data and the two-frame-preceding data are separated by the switch 11 in response to the switching clock S2. The movable contact 11c is connected to the memory 3. As mentioned before, the movable contact 11c is alternately connected to either of the stationary contacts 11a or 11b in response to the switching clock S2. Thus, the two-frame-preceding signal is generated at the stationary contact 11a. The one-frame-preceding signal is generated at the stationary contact 11b.

The switches 10 and 11 are controlled by common switching pulses i.e. the switching clock S2 so that they are synchronized. The sync relationship between the switches 10 and 11 is as follows. When the movable contact 10c is connected to the stationary contact 10a, the movable contact 11c is connected to the stationary contact 11a of the switch 11.

Figure 5:
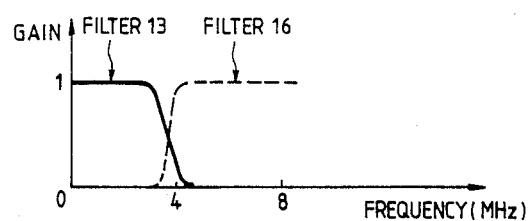
FIG. 5 is a diagram showing the frequency characteristics of the low pass filter and the high pass filter of FIG. 3.

The one-frame-preceding signal is fed from the switch 11 to the switch 10 and a subtracter 12. The subtracter 12 also receives the current input Y signal via the input terminal 1. The subtracter 12 derives a difference between the one-frame-preceding signal and the current Y signal. The subtracter 12 cancels signal components corresponding to the correlation between successive frames and thus extracts other signal components including non-correlated signal components or noise components. An output signal from the subtracter 12 is passed to a multiplier 14 through a low pass filter 13. As shown in FIG. 5, the filter 13 has the pass band of 0 to 4 MHz. In the frame-offset sampling of the MUSE system, signal components related to the recursion with the two-frame period are not folded into the frequency range below 4 MHz. The filter 13 removes such signal components related to the recursion with the two-frame period and thus separates the noise components having a recursion with a period corresponding to one frame. The multiplier 14 multiplies an output signal from the filter 13 by a predetermined coefficient K1. The coefficient K1 is preferably equal to a relatively large value within the range between 0 and 1 in order to enhance a noise reduction effect. It should be noted that the coefficient K1 may be varied between 0 and 1 in accordance with the motion of pictures corresponding to the input Y signal in a known way. An output signal from the multiplier 14 is added by the adder 9 to the input Y signal so that the correlated noise components in the Y signal are reduced.

Figure 6:
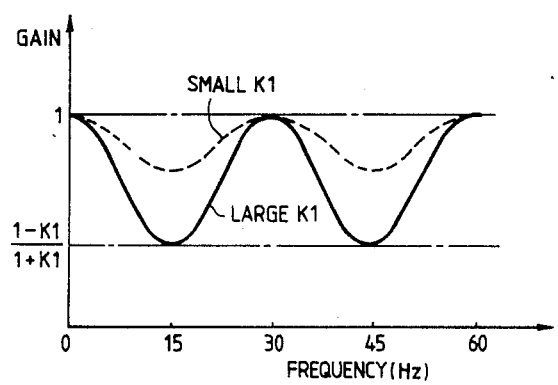
FIG. 6 is a diagram showing the frequency characteristic of the first section of the recursive noise-reducer of FIG. 3.

The network composed of the devices 9, 10, 3, 11, 12, 13, and 14 forms a first section of the recursive noise-reducer, the first section being based on the correlation between successive frames. In general, human eyes are more sensitive to noises in the frequency range of 0 to 4 MHz than noises in the frequency range above 4 MHz. The first section of the recursive noise-reducer operates on such low frequency noises. The coefficient K1 is designed so as to ensure an adequate effect of noise reduction. The first section of the recursive noise-reducer has a frequency response characteristic as shown in FIG. 6.

The two-frame-preceding signal is fed from the switch 11 to a subtracter 15. The subtracter 15 also receives the current input Y signal via the input terminal 1. The subtracter 15 derives a difference between the two-frame-preceding signal and the current Y signal. The subtracter 15 cancels signal components corresponding to the correlation between frames separated at two-frame intervals and thus extracts other signal components including non-correlated signal components or noise components. An output signal from the subtracter 15 is passed to a multiplier 17 through a high pass filter 16. As shown in FIG. 5, the filter 16 has the pass band above 4 MHz. The filter 16 selects the noise components. The multiplier 17 multiplies an output signal from the filter 16 by a predetermined coefficient K2 in the range of 0 to 1. It should be noted that the coefficient K2 may be varied between 0 and 1 in accordance with the motion of pictures corresponding to the input Y signal in a known way. An output signal from the multiplier 17 is added by the adder 9 to the input Y signal so that the correlated noise components in the Y signal are reduced.

Figure 7:
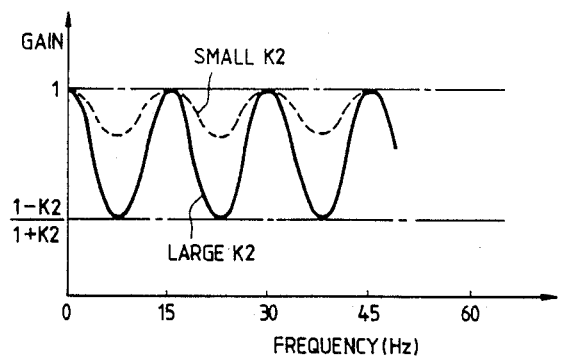
FIG. 7 is a diagram showing the frequency characteristic of the second section of the recursive noise-reducer of FIG. 3.

The network composed of the devices 9, 10, 3, 11, 15, 16, and 17 forms a second section of the recursive noise-reducer, the second section being based on the correlation between frames separated at two-frame intervals. The second section of the recursive noise-reducer operates on noises in the frequency range above 4 MHz. The coefficient K2 is designed so as to ensure an adequate effect of noise reduction. The second section of the recursive noise-reducer has a frequency response characteristic as shown in FIG. 7.

As understood from the previous description, Y signal components in the frequency range of 0 to 4 MHz (Y signal components having a recursion with a period of one frame) are processed by the first section of the noise reducer which is based on the correlation between successive frames, while Y signal components in the frequency range above 4 MHz (Y signal components having a recursion with a period of two frames) are processed by the second section of the noise reducer which is based on the correlation between frames separated at two-frame intervals. In addition, the multiplication coefficients K1 and K2 of the first and second sections of the noise reducer can be determined and adjusted mutually independent. Accordingly, noises can be effectively reduced in both of the frequency range of 0 to 4 MHz and the frequency range above 4 MHz.

Figure 8:
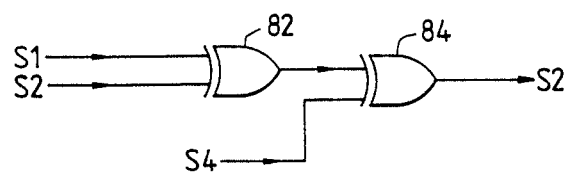
FIG. 8 is a block diagram of a generator for switching clocks used in the recursive noise-reducer of FIG. 3.

FIG. 8 shows an example of a generator for the switching clock S2. As shown in FIG. 8, the generator includes gates 82 and 84. A first input terminal of the gate 82 receives the sub sampling clock S1. A second input terminal of the gate 82 receives a bi-level signal S3 having a frequency one half of the line frequency and changing a level between a high level and a low level, but the bi-level signal S3 is reset to assume the same level at every first line of each frame. Specifically, the line signal S3 assumes the high level during a period corresponding to each of the even-numbered lines and assumes the low level during a period corresponding to each of the odd-numbered lines. An output from the gate 82 is fed to a first input terminal of the gate 84. A second input terminal of the gate 84 receives a bi-level signal S4 having a frequency one half of the frame frequency and changing a level between a high level and a low level. Specifically, the frame signal S4 assumes the high level during a period corresponding to each of the even-numbered frames and assumes the low level during a period corresponding to each of the odd-numbered frames. The gate 84 outputs the switching clocks S2.

It should be noted that this embodiment may be modified in various ways. In a modification of this embodiment, the filter 16 is removed so that the subtracter 15 and the multiplier 17 are directly coupled to each other. In this modification, the multiplication coefficient K2 is designed so as to match all frequency bands.

Figure 9:
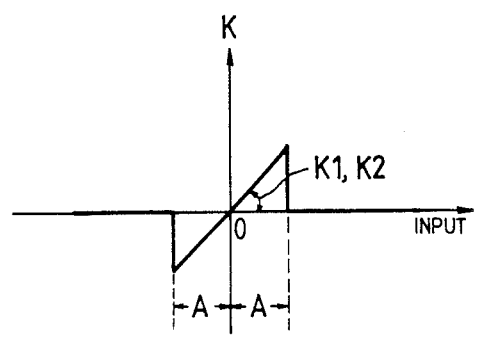
FIG. 9 is a diagram showing the relationship between the multiplication coefficient and the level of the input signal to the related multiplier in the recursive noise-reducer of FIG. 3.

In another modification of this embodiment, at least one of the multiplication coefficients K1 and K2 is varied in accordance with the level of the input signal to the related multiplier as shown in FIG. 9. Specifically, the multiplication coefficient increases linearly with the input signal level in a predetermined range defined by a threshold input range "A". The multiplication coefficient remains 0 outside the predetermined range. This design is based on the following fact. Since the input signal to the multiplier corresponds to noise components, the level of the input signal is generally lower than a certain level. The design of the multiplication coefficient thus removes signal components other than noise components.

DESCRIPTION OF THE SECOND PREFERRED EMBODIMENT

Figure 10:
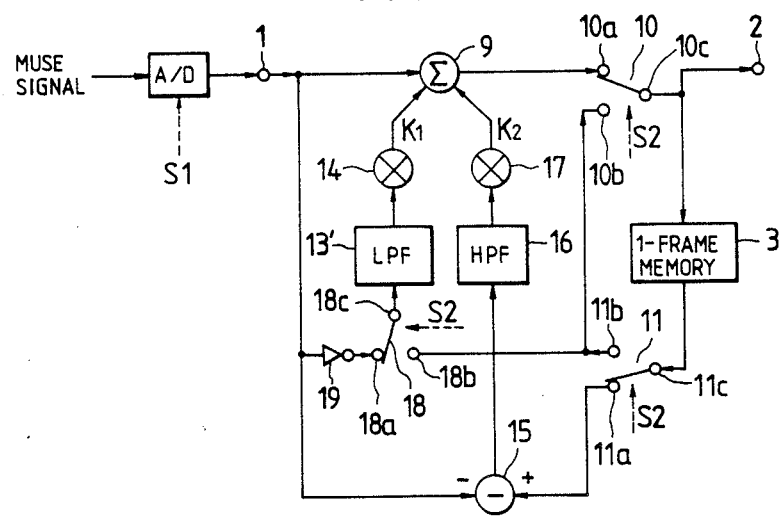
FIG. 10 is a block diagram of a recursive noise-reducer according to a second embodiment of this invention.

FIG. 10 shows a second embodiment of this invention which is similar to the embodiment of FIGS. 1–9 except for changes described hereinafter.

The embodiment of FIG. 10 uses the combination of a switch 18 and an inverter 19 in place of the subtracter 12 of FIG. 3. The input terminal of the inverter 19 receives an input Y signal via an input terminal 1. The switch 18 includes stationary contacts 18a and 18b and a movable contact 18c which is connected to either of the stationary contacts 18a or 18b in response to the switching clock S2 of 16.2 MHz. The stationary contact 18a receives an output signal from the inverter 19 which is the current input Y signal but is polarity-inverted. The stationary contact 18b receives a one-frame-preceding signal from the memory 3 through the switch 11. The movable contact 18c is connected to the low pass filter 13. One of the inverted current Y signal and the one-frame-preceding signal are alternately selected and passed to a low pass filter 13' by the switch 18 in response to the switching clock S2 so that the one-frame-preceding data are interpolated into the inverted current data.

In addition to the function of the low pass filter 13 of the first embodiment, the low pass filter 13' has the function of adding the one-frame-preceding data and the inverted current data which correspond to adjacent picture elements. Since the current data are inverted, this addition corresponds to the subtraction between the one-frame-preceding data and the current data. Accordingly, the combination of the devices 13, 18, and 19 serves as the subtracter 12 of FIG. 3.

The switch 18 and the switch 11 are controlled by the common switching clock S2 so that they are synchronized. The sync relationship between the switch 18 and the switch 11 is as follows. When the movable contact 18c is connected to the stationary contact 18a, the movable contact 11c is connected to the stationary contact 11a of the switch 11.

An output signal from the low pass filter 13 contains the difference components between successive frames with no folded components. Accordingly, the output signal from the low pass filter 13 may be used for other purposes than noise reducing, one of which may be using the output signal as a motion signal needed in a MUSE decoder.

What is claimed is:

1. A recursive noise-reducer comprising:
   first switch means for performing an interframe interpolation process on an input digital signal to thereby convert the input digital signal into an interpolated signal;
   memory means having a capacity equal to one frame of the interpolated signal;
   second switch means for outputting from the memory means a one-frame-preceding interpolated signal component of the input digital signal and a two-frame-preceding interpolated signal component of the input digital signal;
   first subtracting means for deriving a difference between the input digital signal and the one-frame-preceding interpolated signal component;
   a first filter means for filtering an output signal from the first subtracting means and for passing a signal component having a recursion with a period corresponding to one frame;
   a first multiplier means for multiplying an output signal from the first filter means by a predetermined first coefficient;
   second subtracting means for deriving a difference between the input digital signal and the two-frame-preceding interpolated signal component;
   a second filter means for filtering an output signal from the second subtracting means and for passing a signal component having a recursion with a period corresponding to two frames;
   a second multiplier means for multiplying an output signal from the second filter means by a predetermined second coefficient; and
   and adder for adding the input digital signal, and output signal from the first multiplier means and an output signal from the second multiplier means;
   wherein the first switch means alternately selects an output signal from the adder and the one-frame-preceding interpolated signal component to thereby generate the interpolated signal with reduced noise components.

2. The recursive noise-reducer of claim 1 wherein the first subtracting means comprises an inverter for inverting the input digital signal, and a switch alternately selecting and passing an output signal from the inverter and the one-frame-preceding interpolated signal component to the first filter means, the first filter means adding the output signal from the inverter to the one-frame-preceding interpolated signal component.

3. A recursive noise-reducer comprising:
   interpolation means including memory means for performing an interpolation process on an input digital signal to thereby convert the input digital signal into an interpolated signal, and for producing a one-frame-preceding interpolated signal component and a two-frame-preceding interpolated signal component of the input digital signal;
   first subtracting means for deriving a difference between the input digital signal and the one-frame-preceding interpolated signal component outputted from the interpolation means;
   a filter for filtering an output signal from the first subtracting means and for passing a signal component having a recursion with a period corresponding to one frame;
   second subtracting means for deriving a difference between the input digital signal and the two-frame-preceding interpolated signal component outputted from the interpolation means; and
   an adder for adding the input digital signal, an output signal from the filter and an output signal from the second subtracting means;
   wherein the interpolation means comprises means for alternately selecting an output signal from the adder and the one-frame-preceding interpolated signal component to thereby generate the interpolated signal with reduced noise components.

4. The recursive noise-reducer of claim 3 further comprising an additional filter disposed between the second subtracting means and the adder for passing a signal component having a recursion with a period corresponding to two frames.

* * * * *